United States Patent
Boileau et al.

(10) Patent No.: US 11,300,076 B2
(45) Date of Patent: Apr. 12, 2022

(54) PROPULSION UNIT INCLUDING LIFTING POINTS DISPOSED ON THRUST REVERSER CYLINDER SUPPORTS

(71) Applicants: Safran Nacelles, Gonfreville L'Orcher (FR); Safran Aircraft Engines, Paris (FR)

(72) Inventors: Patrick Boileau, Moissy-Cramayel (FR); Quentin Garnaud, Moissy-Cramayel (FR); Antoine Elie Hellegouarch, Rond-Point René Ravaud Réau (FR); Gina Ferrier, Moissy-Cramayel (FR)

(73) Assignees: Safran Nacelles, Gonfreville l'Orcher (FR); Safran Aircraft Engines, Paris (FR)

( * ) Notice: Subject to any disclaimer, the term of this patent is extended or adjusted under 35 U.S.C. 154(b) by 0 days.

(21) Appl. No.: 16/998,720

(22) Filed: Aug. 20, 2020

(65) Prior Publication Data
US 2020/0378341 A1   Dec. 3, 2020

Related U.S. Application Data

(63) Continuation of application No. PCT/FR2019/050379, filed on Feb. 19, 2019.

(30) Foreign Application Priority Data

Feb. 20, 2018   (FR) .................................... 18/51444

(51) Int. Cl.
*F02K 1/72* (2006.01)
*B64C 7/02* (2006.01)
(Continued)

(52) U.S. Cl.
CPC .................. *F02K 1/72* (2013.01); *B64C 7/02* (2013.01); *B64D 27/26* (2013.01); *B64D 29/06* (2013.01);
(Continued)

(58) Field of Classification Search
CPC .. F02K 1/72; F02K 1/763; B64C 7/02; B64D 29/06; F05D 2240/90
See application file for complete search history.

(56) References Cited

U.S. PATENT DOCUMENTS 3,666,211 A * 5/1972 Cathers .................. B64D 27/20
                                                          244/54
4,266,741 A * 5/1981 Murphy ................. B64D 27/18
                                                          244/54
(Continued)

OTHER PUBLICATIONS

International Search Report for International Application PCT/FR2019/050379, dated May 28, 2019.

*Primary Examiner* — Lorne E Meade
(74) *Attorney, Agent, or Firm* — Burris Law, PLLC

(57) ABSTRACT

A propulsion unit includes a nacelle, a turbojet engine, and a thrust reverser having gratings provided with movable thrust reversal gratings arranged around an annular duct for fresh air from the turbojet engine. The propulsion unit further includes actuators arranged around the annular duct and each actuator has a front end attached to the turbojet engine and a rear end which translates movable rear covers and gratings for opening, in the annular duct, radial passages which receive said gratings. The propulsion unit further has lifting points that are arranged around the annular duct for lifting the turbojet engine. At least one of the lifting points is formed on a beam for attaching an front end of an actuator.

9 Claims, 3 Drawing Sheets

(51) Int. Cl.
  *B64D 27/26* (2006.01)
  *B64D 29/06* (2006.01)
  *F02K 1/76* (2006.01)

(52) U.S. Cl.
  CPC ........ *F02K 1/763* (2013.01); *B64D 2027/266* (2013.01); *B64D 2027/268* (2013.01); *F05D 2220/323* (2013.01); *F05D 2240/90* (2013.01)

(56) References Cited

U.S. PATENT DOCUMENTS

| | | | | |
|---|---|---|---|---|
| 4,437,627 | A * | 3/1984 | Moorehead | B64D 27/18 244/11 OB |
| 5,947,625 | A * | 9/1999 | Vauchel | F16C 11/0614 403/24 |
| 6,485,247 | B1 * | 11/2002 | Groves | B66F 7/20 180/125 |
| 7,419,121 | B2 * | 9/2008 | Williams | F02C 7/20 244/54 |
| 7,438,262 | B2 * | 10/2008 | Chamberlain | B64D 27/26 244/54 |
| 8,196,859 | B2 * | 6/2012 | Marche | B64D 27/26 244/54 |
| 9,159,566 | B2 * | 10/2015 | Bohr | H01L 21/28088 |
| 9,366,201 | B2 * | 6/2016 | Caruel | F02K 1/763 |
| 2011/0265327 | A1 | 11/2011 | West | |
| 2015/0113787 | A1 | 4/2015 | Holay et al. | |
| 2016/0160799 | A1 | 6/2016 | Gormley | |
| 2017/0240388 | A1 * | 8/2017 | Heinzmann | B66C 1/20 |

* cited by examiner

PROPULSION UNIT INCLUDING LIFTING POINTS DISPOSED ON THRUST REVERSER CYLINDER SUPPORTS

CROSS-REFERENCE TO RELATED APPLICATIONS

This application is a continuation of International Application No. PCT/FR2019/050379, filed on Feb. 19, 2019, which claims priority to and the benefit of FR 18/51444 filed on Feb. 20, 2018. The disclosures of the above applications are incorporated herein by reference.

FIELD

The present disclosure relates to a propulsion unit comprising a nacelle and a turbojet engine including a cascade thrust reverser and lifting points of this unit.

BACKGROUND

The statements in this section merely provide background information related to the present disclosure and may not constitute prior art.

Turbojet engines for motorizing aircraft disposed in a nacelle, receive fresh air coming from the front side, and reject, from the rear side, the hot gases resulting from the combustion of the fuel delivering a thrust.

For the bypass turbojet engines, fan blades disposed around the motor generate a significant secondary flow of cold air along an annular flow path passing between this motor and the nacelle, which adds a high thrust.

Some nacelles include a thrust reverser system which at least partially closes the annular flow path of cold air, and rejects the secondary flow radially outwardly by directing it forward in order to generate a braking reverse thrust of the aircraft.

A known cascade thrust reverser type, presented in particular by U.S. Publication No. 201610160799A1, includes thrust reverser cascades forming a ring disposed under fan casing cowls (this casing often being called carter fan), surrounding the annular flow path, which are connected to rear movable cowls sliding axially rearwards under the effect of cylinders having one end fastened to the outside of the annular flow path of the turbojet engine.

In a closed position of the thrust reverser for a direct flow, the rear movable cowls close outward lateral passages formed around the annular flow path.

In an open position of the thrust reverser for a reverse flow, the rear movable cowls move back on longitudinal guides, by driving the cascades which are positioned in the radial air passages. Closing flaps at least partially close the secondary flow rearwardly of these passages, by conveying the flow radially towards the cascades which reverse the thrust.

Moreover, the turbojet engines generally include lifting points disposed on the periphery of the annular flow path, under the outer cowls, forming strong anchor points receiving handling interfaces for lifting and transporting the turbojet engine and elements of the nacelle.

In particular, a lifting point can be formed on each lateral side of the motor, at the limit of the thrust reverser cascades.

The contour of the annular flow path of the turbojet engine must then have strong anchors to make, on the one hand, the supports of the fixed ends of the control cylinders of the thrust reverser, and on the other hand, the lifting points for the handling, with suitable reinforcements in order to obtain a sufficient resistance against the efforts developed on these points, which increases the size, the weight and the costs of the turbojet engine and of the equipment of the nacelle.

In addition, the access to the lifting points requires a more or less complete disassembly of the outer cowls of the thrust reverser covering these points, which takes time and complicates the intervention methods.

SUMMARY

This section provides a general summary of the disclosure and is not a comprehensive disclosure of its full scope or all of its features.

The present disclosure addresses these and other drawbacks of the prior art.

In one form, the present disclosure proposes a propulsion unit comprising a nacelle and a bypass turbojet engine. The nacelle includes a cascade thrust reverser equipped with movable thrust reverser cascades disposed around an annular flow path of fresh air of the turbojet engine and cylinders disposed around the annular flow path. Each of the cylinders has a front end fastened to the turbojet engine and a rear end that drives, in translation, movable rear cowls and cascades to open, in the annular flow path, radial passages receiving these cascades. The bypass turbojet includes lifting points disposed around the annular flow path of fresh air of the turbojet engine. At least one of the lifting points is formed on a support for fastening a front end of a cylinder from among the cylinders.

By using the supports for fastening fixed ends of the cylinders of the thrust reverser, highly rigid elements already installed in the nacelle for the thrust reverser are put in common, disposed around the annular flow path, to form the lifting points. In this manner, the reinforcement of other areas around the annular flow path is inhibited, which would have to be made to install lifting points distinct from the fittings for fastening the cylinders. The weight, size and cost of the nacelle can be reduced.

In addition, in one form, the cowls of the nacelles generally include inspection hatches to access the cylinders of the thrust reverser, in order to perform maintenance operations. An arrangement of the lifting points at these locations allow using existing inspection hatches to access these points, and fastening handling interfaces thereto.

The propulsion unit including a turbojet engine and a nacelle according to the present disclosure may include one or more of the following features, which may be combined with each other.

In other forms, each lifting point of the turbojet engine can include one or more fastening surfaces or interfaces intended for mounting a handling and hoisting tooling.

In other such forms, each lifting point includes, on each side of the cylinder, at least one fastening interface formed on the support and intended for mounting a handling and hoisting tooling.

In this manner, the efforts are distributed and balanced on the support relative to the axis of the cylinder.

In even other such forms, at least one fastening interface has a flat surface extending tangentially relative to the axis of the nacelle and including bores for fastening a handling interface.

In yet other such forms, the support for fastening a front end of a cylinder includes a central portion securely connected to a shell of a motor casing disposed downstream of a fan casing of the turbojet engine. The front end of the cylinder is fastened to this central portion, and lateral portions are secured to the central portion and each include at least one fastening interface.

In further such other forms, the central portion of the support is fastened to a frame forming a flange fastened to the shell of the motor casing.

In still further such other forms, the motor casing includes an outer shell of an intermediate casing which has blades for straightening the flow of the annular flow path of fresh air of the turbojet engine.

In even further such other forms, the central portion of the support is further fastened to the fan casing.

In still other such forms, at least one fastening interface comprises an assembly of clevises and axes.

In further other such forms, the nacelle embeds, on each of the two lateral sides thereof, a lifting point disposed on a cylinder fitting. The cylinder fitting is mounted on a right or left upper quadrant of the nacelle.

In yet further other such forms, each fastening point is disposed behind a hatch formed on a cowl of the nacelle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 1 and 2 show an overview and a detail view of a turbojet engine nacelle assembly according to the prior art, including lifting points;

FIGS. 3*a* and 3*b* are front views of the propulsion unit according to the present disclosure, in cross section passing through the lifting points, according to two possible forms;

Figure 1:
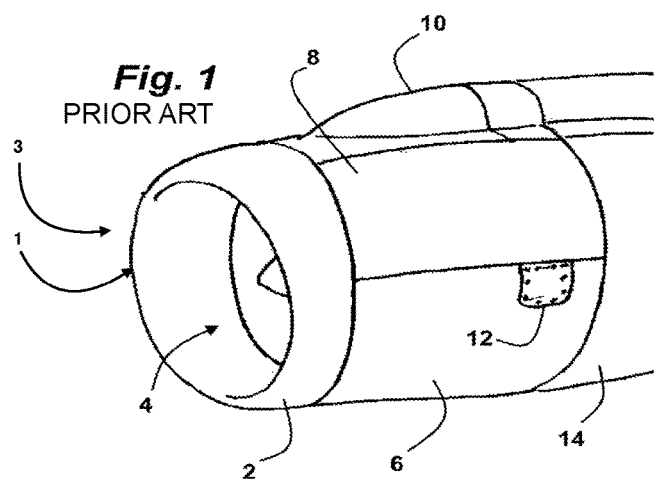

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
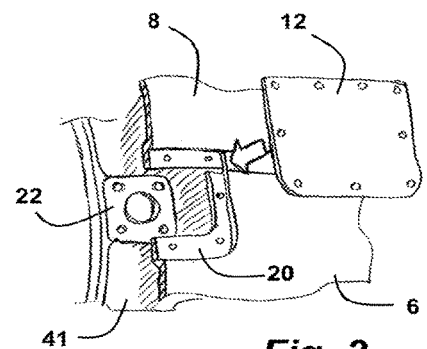

FIGS. 1 and 2 show a propulsion unit 3 with a nacelle 1 and a bypass turbojet engine 5 (see FIG. 6) supported by a mast disposed at 12 o'clock (this notion of time being understood relative to the dial of a clock, corresponding to a cross section of the propulsion unit 3), including at the front a circular air inlet cowl 2 surrounding an air inlet 4.

A front portion of the nacelle 1, axially forming a cowling segment disposed in the extension of the air inlet cowl 2, includes on each side a lower fan cowl 6 connected to an upper fan cowl 8. A mast cowl 10 connecting on top the two upper cowls 8, has a profile covering the mast.

The nacelle 1 includes on the rear of the fan cowls 6, 8, movable rear cowls 14 which move back under the effect of cylinders disposed longitudinally, to open radial passages formed around the annular flow path of cold air. Thrust reverser cascades disposed upstream of the radial passages, under the fan cowls 6, 8, slide with the rear movable cowls 14 to come into the radial passages of the annular flow path in order to direct the cold air flow forward.

A lifting point 22 is fastened on a fan casing 41 of the turbojet engine 5 on each side of the propulsion unit 3, on clean supports independent of the supports of the cylinders of the thrust reverser.

FIGS. 3*a*, 3*b*, 4 and 5 show a propulsion unit 3 according to the present disclosure whose nacelle 1 includes at least one cowl 6 disposed in the lower portion of this nacelle 1, and two upper cowls 8 covering the sides of the nacelle 1.

The thrust reverser cascades 30 are connected downstream to the movable structure of the thrust reverser driven by cylinders 40 for opening the thrust reverser.

These cylinders 40 each have a front end 44 fastened to the fan casing 41 and to an outer shell of an intermediate casing 43 (see FIG. 5) via a support to obtain good rigidity. In a manner known per se, the intermediate casing 43 comprises blades 7 for straightening the flow of the annular flow path of fresh air of the turbojet engine 5. These blades 7 connect an inner shell and an outer shell of the intermediate casing to each other. In what follows, a support 46 for a front end 44 of a cylinder 40 is also called a front support 46. Each cylinder 40 further includes a rear end 42 fastened to a movable frame driving the thrust reverser cascades 30 and the rear movable cowls 14.

Figure 3A:
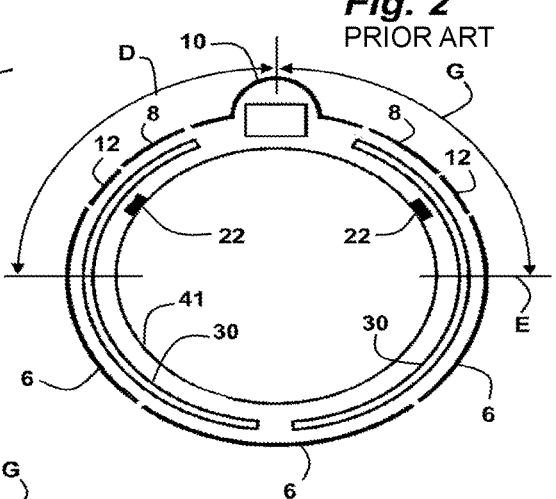

In particular two cylinders 40 are disposed a little above a horizontal diameter of the propulsion unit 3, at about 2 o'clock and 10 o'clock, that is to say, in the upper quadrants D and G, as shown in FIG. 3*a*.

Each upper cowl 8 has a hatch 12 allowing access to the front end of a cylinder 40 disposed behind to perform maintenance operations on this cylinder.

The front support 46 is fastened on the fan casing 41 and on the intermediate casing shell 43, by having a high rigidity allowing it to withstand the expansion and tensile efforts exerted by the cylinder 40, to oppose in particular the aerodynamic forces being applied on the movable rear cowls 14, the closing flaps of this flow path and the thrust reverser cascades 30 during a deployment of the thrust reverser.

In one form, the front support 46 includes a central portion 47 and lateral portions 49-1 and 49-2 (collectively "lateral portions 49"). The central portion 47 is securedly connected to the intermediate shell casing 43 disposed downstream of the fan casing 41 of the turbojet engine 5. The front end of the cylinder 40 is fastened to the central portion 47. The lateral portions 49 are secured to the central portion 47, and each of the lateral portions 49 includes at least a fastening interface 50. In another form, the central portion 47 is fastened to a frame forming a flange fastened to the shell of the intermediate casing 43.

Alternatively, the front support 46 could also be fastened on the single shell of the intermediate casing 43, in particular when the fan casing 41 is made of composite material: in this case, in fact, it would be desirable to provide inserts in the fan casing 41, which is more complex to manufacture.

The front support 46 has on each side of the front end of the cylinder 44 a fastening interface 50, which in one form has a flat surface, disposed tangentially relative to the axis of the propulsion unit 3, including two bores 48 aligned in the longitudinal direction, to form a lifting point 22. The two fastening interfaces 50 of each front support 46 constitute a fastening face of a handling interface 52, the bores 48 allowing a clamping on this face, in order to center and fasten in a stable manner this interface on the propulsion unit 3.

Figure 3B:
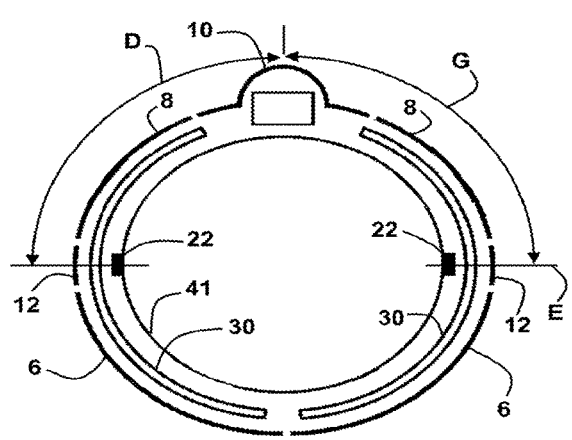
Figure 4:
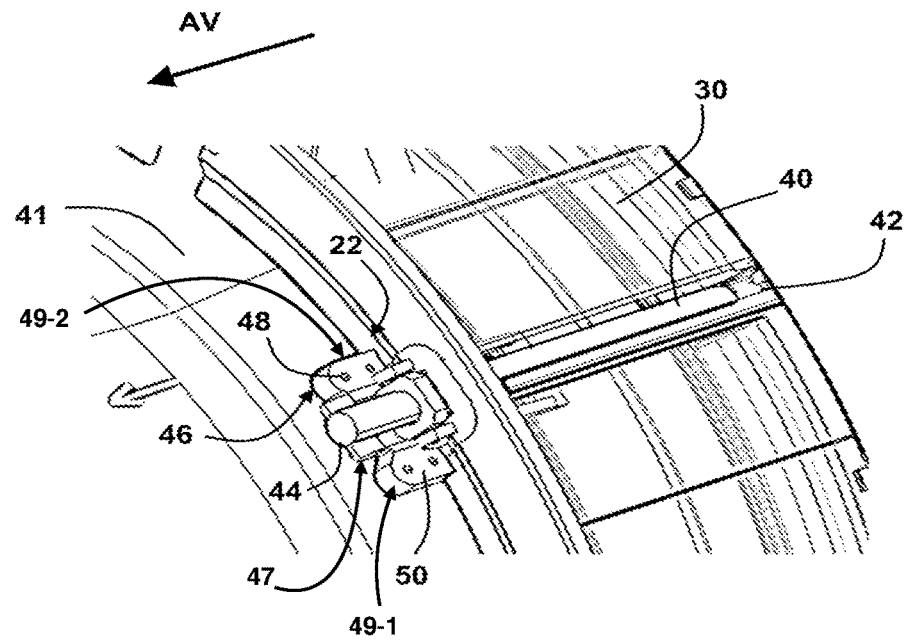
FIG. 4 is an outside view of a cylinder for actuating the thrust reverser of the nacelle of this propulsion unit, the front of the propulsion unit being indicated by arrow AV.
Figure 5:
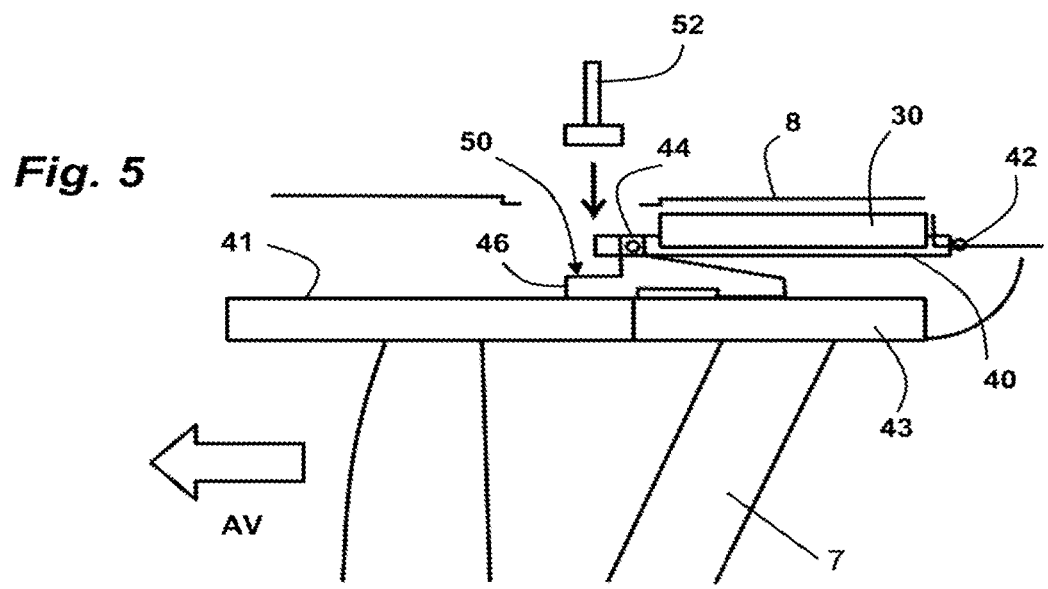
FIG. 5 is an axial sectional view passing through this cylinder, the front of the propulsion unit being indicated by arrow AV.

Alternatively, the front supports 46 forming lifting points could also be disposed in other areas of the right (D) and left (G) upper quadrants, and in particular at 3 o'clock and 9 o'clock, that is to say along the Equator line E, as shown in FIG. 3b.

Figure 6:
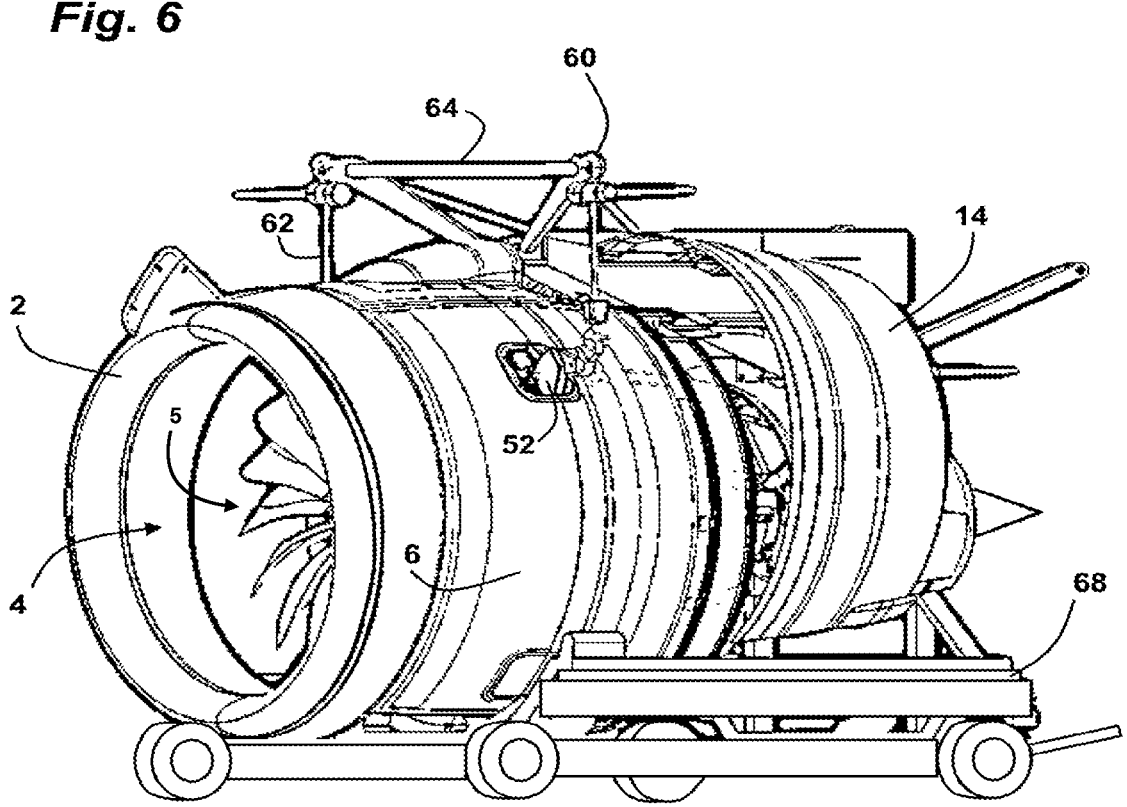
FIG. 6 shows the propulsion unit lifted by the fastening points thereof, disposed above a transport carriage.

FIG. 6 shows after the removal of the hatches 12 and the opening of the portion of the nacelle 1 remaining on the airplane, the fastening of a handling interface 52 on each lifting point 22. It should be noted that the handling interfaces 52 are fastened on the nacelle 1, without opening or removing outer cowls.

A lifting tackle 60 includes two suspensions 62 connected by a horizontal bar 64, each having at the base a hook which is fastened on a handling interface 52. Another hooking point on the tackle is located at the rear of the turbojet. The propulsion unit 3 can then be lifted in a secure manner, to place it on a transport carriage 68.

The vertical pulling on the handling interfaces 52 applies an effort on the front supports 46, which is not added simultaneously to the efforts exerted thereon by the cylinder 40 during the operation of the thrust reverser. In this way, these two types of effort are not combined at the same time on the supports 46, which inhibits applying high stresses thereon, and dimensioning them for an accumulation of effort.

Thus, with few changes of existing nacelles, lifting points 22 may be made in a simple and cost-effective manner.

The addition of mass to the cylinder fittings in order to form the lifting points 22 with the fastening interfaces 50 thereof can be relatively limited, such that the mass balance for the propulsion unit 3 is favorable compared to an existing solution in which specific anchoring elements forming lifting points are provided on the periphery of the annular flow path.

Indeed, according to the present disclosure, these specific anchoring elements can be reduced or eliminated, and thus, the mass removed being greater than the mass added on the cylinder fittings.

The sizing and the fastening of the existing cylinder fittings on the turbojet engine 5 are generally sufficient to provide a structure capable of withstanding the lifting efforts, such that a reinforcement of the fittings or of the fastening means thereof on the turbojet engine 5 will generally not be necessary.

Consequently, the addition of mass on the fittings will mainly result from the formation of the lifting points.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A propulsion unit comprising:
    a nacelle comprising moveable rear cowls;
    a bypass turbojet engine comprising lifting points;
    a cascade thrust reverser equipped with movable thrust reverser cascades disposed around an annular flow path of fresh air of the bypass turbojet engine; and
    a plurality of cylinders disposed around the annular flow path, wherein each of the cylinders has a front end fastened to the bypass turbojet engine and a rear end that drives, in translation, the movable rear cowls and cascades to open, in the annular flow path, radial passages receiving the cascades, wherein:
    the lifting points of the bypass turbojet engine are disposed around the annular flow path of fresh air of the turbojet engine, and
    at least one of the lifting points is formed on a fitting for fastening the front end of the cylinders to the bypass turbojet engine.

2. The propulsion unit according to claim 1, wherein for a cylinder from among the plurality of cylinders, the at least one lifting point includes, on each side of the cylinder, at least one fastening interface formed on the fitting to mount a handling and hoisting tooling.

3. The propulsion unit according to claim 2, wherein the at least one fastening interface has a flat surface extending tangentially relative to an axis of the nacelle and defines bores for fastening a handling interface.

4. The propulsion unit according to claim 2, wherein the fitting for fastening the front end of the cylinder comprises:
    a central portion securely connected to a shell of a motor casing disposed downstream of a fan casing of the turbojet engine, wherein the front end of the cylinder is fastened to the central portion, and
    lateral portions secured to the central portion, wherein each of the lateral portions includes the at least one fastening interface.

5. The propulsion unit according to claim 4, wherein the central portion of the fitting is fastened to a frame forming a flange fastened to the shell of the motor casing.

6. The propulsion unit according to claim 4, wherein the motor casing is constituted by an outer shell of an intermediate casing, wherein the outer shell of the intermediate casing comprises blades for straightening the flow of the annular flow path of fresh air of the turbojet engine.

7. The propulsion unit according to claim 4, wherein the central portion of the fitting is further fastened to the fan casing.

8. The propulsion unit according to claim 1, wherein the nacelle embeds, on each of two lateral sides thereof, a lifting point disposed on a cylinder fitting, the cylinder fitting being mounted on a right or left upper quadrant of the nacelle.

9. The propulsion unit according to claim 1, wherein each fastening point of the cylinder is disposed behind a hatch formed on a cowl of the nacelle.

* * * * *